(12) United States Patent
Farooq

(10) Patent No.: US 6,678,845 B1
(45) Date of Patent: Jan. 13, 2004

(54) ARRANGEMENT FOR TESTING PROGRAMMED PORT REGISTERS OF INTEGRATED NETWORK DEVICE BY READING-BACK VALUES FROM THE PORT REGISTERS

(75) Inventor: Rizwan M. Farooq, Santa Clara, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 488 days.

(21) Appl. No.: 09/770,452

(22) Filed: Jan. 29, 2001

(51) Int. Cl.[7] .................. G01R 3/317; G06F 11/25; G11C 29/00
(52) U.S. Cl. .............. 714/712; 714/719; 714/735; 714/742; 714/750
(58) Field of Search ................ 714/712, 719, 714/735, 742, 750

(56) References Cited

U.S. PATENT DOCUMENTS

| | | | | |
|---|---|---|---|---|
| 5,953,335 | A | | 9/1999 | Erimli et al. |
| 6,501,690 | B2 | * | 12/2002 | Satoh ........................ 714/718 |
| 6,546,482 | B1 | * | 4/2003 | Magro et al. .................. 713/1 |
| 6,550,023 | B1 | * | 4/2003 | Brauch et al. ................ 714/42 |
| 6,553,486 | B1 | * | 4/2003 | Ansari ........................ 712/222 |
| 6,564,161 | B1 | * | 5/2003 | Lin et al. .................... 702/117 |

* cited by examiner

Primary Examiner—R. Stephen Dildine
(74) Attorney, Agent, or Firm—Manelli Denison & Selter PLLC; Leon R. Turkevich

(57) ABSTRACT

A method of testing a port register of an integrated network device includes establishing a programmable value for a register of an integrated network device. The register is programmed with a prescribed value configured to represent the programmable value. A read value is read from the register following the programming with the prescribed value. The programming step is validated by comparing the read value with the programmable value.

8 Claims, 1 Drawing Sheet

ARRANGEMENT FOR TESTING PROGRAMMED PORT REGISTERS OF INTEGRATED NETWORK DEVICE BY READING-BACK VALUES FROM THE PORT REGISTERS

BACKGROUND OF THE INVENTION

1. Field of the Invention

The present invention relates to testing of integrated network devices such as integrated network switches configured for switching data packets between subnetworks.

2. Background Art

Local area networks use a network cable or other media to link stations on the network. Each local area network architecture uses a media access control (MAC) enabling network interface devices at each network node to access the network medium.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received layer 2 type data packet may include a VLAN (virtual LAN) tagged frame according to IEEE 802.1p (802.1D) protocol that enables the network switch to perform more advanced switching operations. For example, the VLAN tag may specify another subnetwork (via a router) or a prescribed group of stations.

A network switch may be tested using a network evaluation board, such as the commercially available Net 186 Embedded Ethernet Demonstration Board, to program the port registers of the high-performance integrated network switch under test. After programming the port registers, a test engineer will perform prescribed tests. However, improper programming of the port registers due to, for example, signal integrity issues may cause the network switch under test to fail the prescribed test. Hence, a test engineer may start a trial and error process to determine the cause of the failure. For example, non-operating switches might be re-soldered to the test board, the physical layer devices (PHYs) might be replaced, etc., in an effort to locate the problem and cause the switch to function properly. In may cases, after spending significant time yet failing to locate the source of the failure, the switch may be simply discarded based on the mistaken belief that the switch is defective.

SUMMARY OF THE INVENTION

There is a need for an arrangement for testing programmed port registers of an integrated network device by reading back the programmed value to ensure that the port register was programmed properly.

This and other needs are attained by the present invention where a method of testing a port register of an integrated network includes establishing a programmable value for a register of an integrated network device. The register is programmed with a prescribed value configured to represent the programmable value. A read value is read from the register following the programming with the prescribed value. The programming step is validated by comparing the read value with the programmable value.

Another aspect of the present invention provides an apparatus configured for testing a register of an integrated network device. The system includes an integrated network device having a port register. Controller structure is connected to the integrated network switch and is configured to program the register with a prescribed value configured to represent a programmable value, to read back from the register a read value following programming with the prescribed value, and to validate the programming step by comparing the read value with the programmable value.

Hence, testing a port register by reading back the programmed value and comparing the value against the intended programmed value saves much time troubleshooting non-operating network switches which fail due to port register programming problems.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
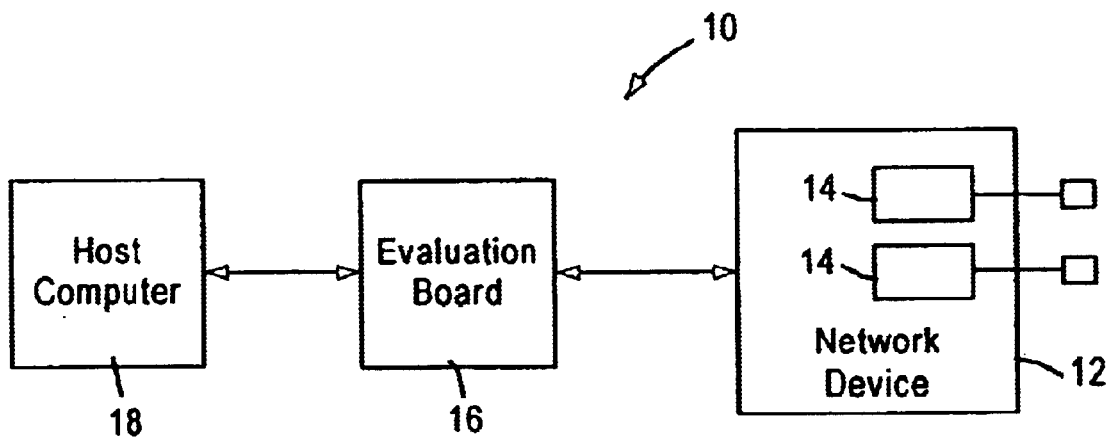
FIG. 1 is a block diagram of a system configured for programming and testing port registers of a device under test, for example an integrated network switch, in accordance with the principles of the present invention.

FIG. 1 is a block diagram illustrating a testing system, generally indicated at 10, configured for testing an integrated (i.e., single chip) network device 12, for example a multiport switch having switch ports that include a media access controller (MAC), enabling transmission and reception of layer 2 type data packets between network stations at 10 or 100 Mbps according to, for example, media independent interface (MII) protocol.

The network device 12 includes the conventional port registers 14 which are programmed with a register value by the use of an evaluation board 16 and a host computer 18. In the embodiment, an AMD Net 186 evaluation board was used together with a personal computer to define controller structure for programming a register 14 with a value and for reading back the value from the register 14. The evaluation board 16 includes a microcontroller and an Ethernet controller.

Figure 2:
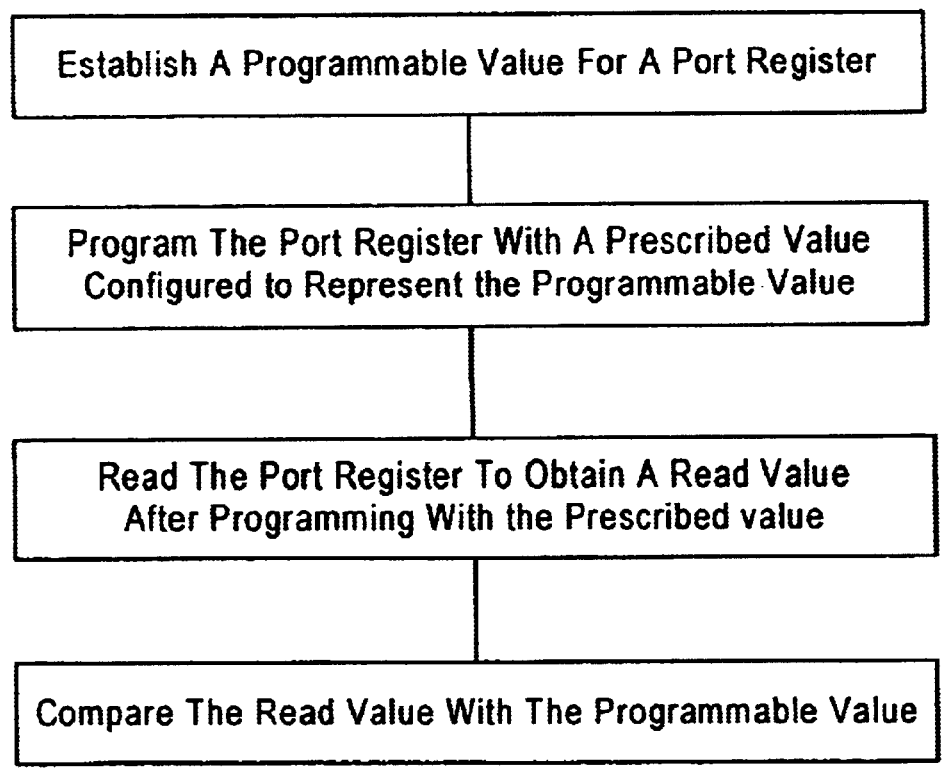
FIG. 2 is a diagram summarizing the method of testing port registers of the system of FIG. 1.

With reference to FIG. 2, the steps of testing the port registers 14 are shown and include in step 30, establishing a programmable value for a port register 14 of an integrated network device 12. Step 32 includes programming the port register 14 with a prescribed value by using the evaluation board 16 and computer 18. A read value of the port register 14 is read back in step 34 following programming with the prescribed value. To validate the programming step, the read value is compared with the programmable value in step 36. If the read value and the programmable value are not the same, it is evident that an error occurred in programming the port register 14.

Thus, significant time can be saved in trouble-shooting an inoperable network device due to improperly programmed registers, since a tester need not use trial and error techniques in an effort to locate the problem once the tester realizes that the port register was programmed improperly.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of testing a register of an integrated network device comprising:

establishing a programmable value for a register of an integrated network device, programming the register with a prescribed value configured to represent the programmable value, reading a read value from the register following the programming with the prescribed value, and validating the programming step by comparing the read value with the programmable value.

2. The method of claim 1, wherein the integrated network device is a network switch.

3. The method of claim 1, wherein the step of programming, reading, and comparing includes using a network evaluation board and a computer in communication with the integrated network device.

4. The method of claim 1, wherein the register is a port register.

5. The method of claim 1, wherein the prescribed value is intended to be the programmable value.

6. A system for testing a register of an integrated network device, the system comprising:

an integrated network device having a register, and controller structure connected to the integrated network device configured to program the register with a prescribed value configured to represent a programmable value, to read back from the register a read value following programming with the prescribed value, and to validate the programming step by comparing the read value with the programmable value.

7. The system of claim 6, wherein the register is a port register.

8. The system of claim 6, wherein the controller structure includes a computer and a network evaluation board.

* * * * *